(12) United States Patent
Popp

(10) Patent No.: US 8,596,901 B1
(45) Date of Patent: Dec. 3, 2013

(54) UNIVERSAL ATTACHMENT DEVICE FOR MACHINERY

(76) Inventor: Howard C. Popp, Rice, MN (US)

( * ) Notice: Subject to any disclaimer, the term of this patent is extended or adjusted under 35 U.S.C. 154(b) by 513 days.

(21) Appl. No.: 12/949,128

(22) Filed: Nov. 18, 2010

(51) Int. Cl.
*F16B 21/00* (2006.01)

(52) U.S. Cl.
USPC .............. 403/324; 403/109.6; 403/322.3; 403/325

(58) Field of Classification Search
USPC ............. 403/109.1, 109.3, 109.6, 322.3, 324, 403/325; 414/607, 645, 646, 785
See application file for complete search history.

(56) References Cited

U.S. PATENT DOCUMENTS

| | | | |
|---|---|---|---|
| 2,301,808 A | | 11/1942 | Mosher |
| 2,764,307 A | * | 9/1956 | Kughler .................... 414/607 |
| 3,050,206 A | * | 8/1962 | McCracken ................ 414/607 |
| 3,587,887 A | | 6/1971 | De Carli |
| 3,876,091 A | * | 4/1975 | MacDonald ............... 414/723 |
| 4,648,769 A | * | 3/1987 | Stirling .................... 414/24.6 |
| 5,324,162 A | * | 6/1994 | Kishi ........................ 414/723 |
| 5,560,129 A | * | 10/1996 | Rothbart .................... 37/231 |
| 5,597,281 A | | 1/1997 | Croiset et al. |
| 5,749,697 A | * | 5/1998 | Davis ....................... 414/680 |
| 6,065,926 A | * | 5/2000 | Knapp ...................... 414/667 |
| D459,855 S | | 7/2002 | Fujikawa et al. |
| 6,481,949 B1 | | 11/2002 | Cullen |
| 6,568,898 B2 | | 5/2003 | Nishimura et al. |
| 7,229,109 B2 | | 6/2007 | Leibovitz |
| 2004/0208734 A1 | * | 10/2004 | Shoemyer et al. ........ 414/607 |
| 2005/0019144 A1 | * | 1/2005 | Neria ....................... 414/607 |
| 2005/0129494 A1 | * | 6/2005 | Chandler et al. .......... 414/607 |
| 2006/0193716 A1 | | 8/2006 | Marmur et al. |
| 2009/0297320 A1 | * | 12/2009 | Daraie et al. .............. 414/785 |

* cited by examiner

*Primary Examiner* — Victor MacArthur

(57) ABSTRACT

A universal attachment device for attaching accessories to machinery featuring a center bar having a beveled first end; a base platform attached to the second end of the center bar, the base platform being generally perpendicular to the center bar; side braces disposed on each the first side of the center bar, the second side of the center bar, and the top side of the center bar, the braces are also attached to the front surface of the base platform; a generally hollow and generally trapezoidal attachment sleeve for removably attaching to the center bar via an attachment means, wherein a first slot is disposed in the back adapted to receive the first end of the center bar; brace platforms disposed on the back surface of the base platform near the first and second sides; and one or more lug components disposed on the front surface of the base platform.

10 Claims, 5 Drawing Sheets

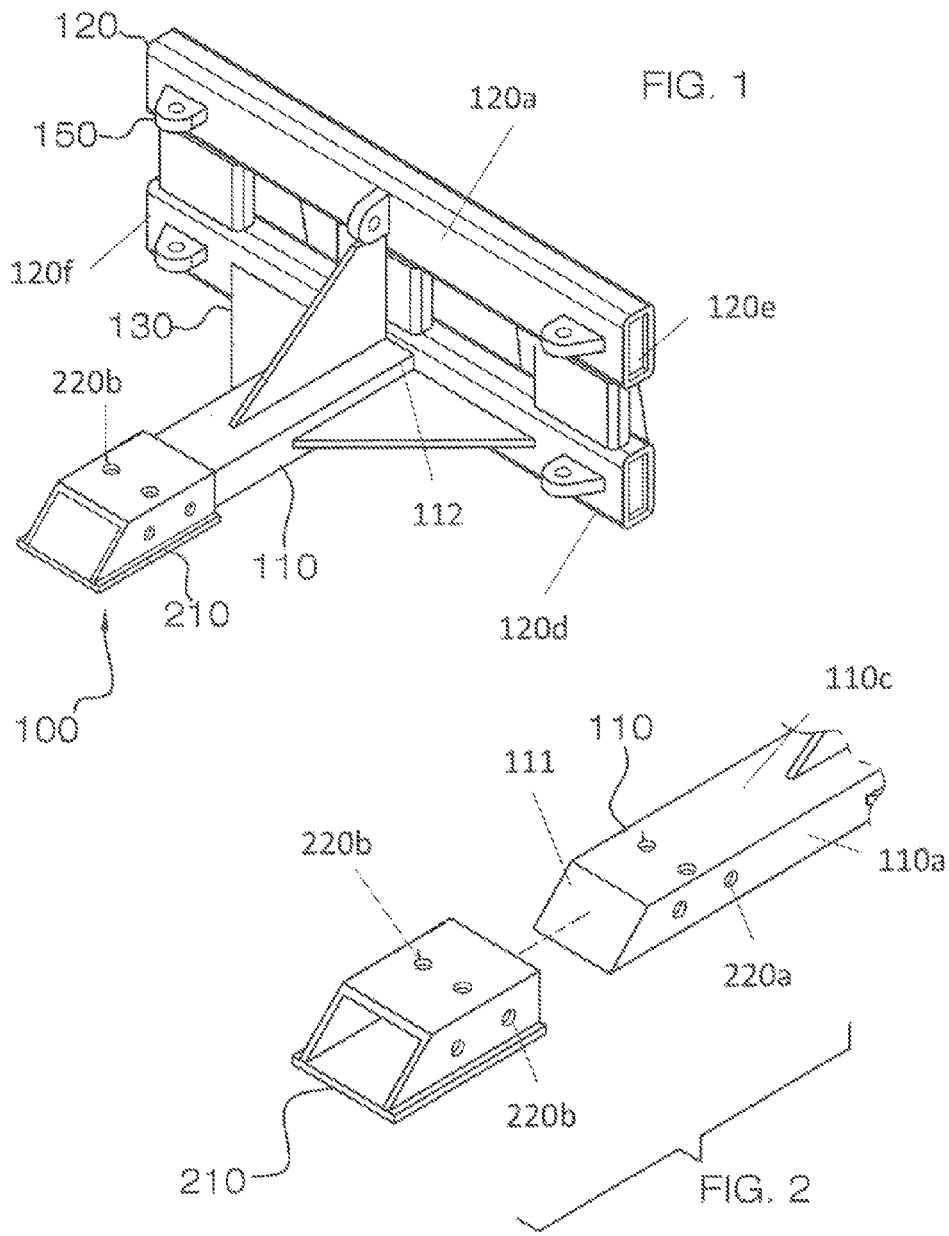

UNIVERSAL ATTACHMENT DEVICE FOR MACHINERY

FIELD OF THE INVENTION

The present invention is directed to a universal attachment device for attaching various accessories to heavy machinery, more particularly to a universal attachment device for attaching accessories such as ice spades (e.g., for smashing ice), forage fork (e.g., for breaking up compacted ground), hooks (e.g., for moving retaining walls), and the like. The present invention is not limited to use for smashing ice or moving retaining walls.

BACKGROUND OF THE INVENTION

Ice has a tendency to accumulate in many areas during winter months. For example, parking lots (e.g., in shopping centers) accumulate piles of snow and ice, and even farmland accumulates frozen snow and ice. Such accumulated snow and ice has a tendency to cause accidents, for example parking lot accidents and animal-related accidents on farm properties (e.g., cattle slipping on ice or hard snow). The present invention features a universal attachment device (a "Power Bar") for attaching accessories to heavy machinery. For example, the universal attachment device may be used to attach an ice-crushing accessory to a piece of heavy machinery, for example for breaking up ice in a parking lot or on farmland. The present invention is not limited to attaching ice-crushing accessories. For example, the universal attachment device may be used to attach an accessory for helping to move retaining walls.

The main frame of the universal attachment device of the present invention is built to withstand the abuse associated with construction and farming. The universal attachment device of the present invention comprises an interchangeable attaching sleeve (a "universal" attachment), which allows the universal attachment device to be attached to anything. In some embodiments, a user can bolt on a hook accessory to the universal attachment device to help move retaining wall blocks. Or, a user can attach a mini grapple bucket or an ice spade to the universal attachment device for helping to break up frozen ground (e.g., the ice spade may work well for removing ice and compacted snow in shopping center parking lots, etc.). A user may alternatively make a wood splitter with the universal attachment device and attach the universal attachment device to a hydraulic operated shear. A user may alternatively trim trees by bolting on a hydraulic operated chain saw to the universal attachment device. The present invention is not limited to the aforementioned uses.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a universal attachment device for attaching accessories to heavy machinery. In some embodiments, the universal attachment device comprises a center bar having a first end and a second end, the first end being beveled; a base platform having a front surface, a back surface, a top edge, and a bottom edge, wherein the second end of the center bar is attached to the front surface of the base platform at or near the bottom edge, the base platform being generally perpendicular to the center bar; a first side brace disposed on a first side of an outer surface of the center bar and attached to the front surface of the base platform, a second side brace disposed on a second side of the outer surface of the center bar and attached to the front surface of the base platform, and a third side brace disposed on a top side of the outer surface of the center bar and attached to the front surface of the base platform; a generally hollow and generally trapezoidal attachment sleeve for removably attaching to the center bar via an attachment means, the attachment sleeve has a top surface, a bottom surface, a slanted front, and a back, wherein a first slot is disposed in the back, the slot is adapted to receive the first end of the center bar; a first brace platform disposed on the back surface of the base platform near the first side and a second brace platform disposed on the back surface of the base platform near the second side; and one or more lug components disposed on the front surface of the base platform.

In some embodiments, the center bar has a generally rectangular cross section. In some embodiments, the side braces are each generally triangular in shape. In some embodiments, a second slot is disposed in the front of the attachment sleeve. In some embodiments, the attachment means includes one or more first mounting holes disposed in the center bar near the first end and one or more second mounting holes are disposed in the attachment sleeve, the mounting holes are adapted to allow attachment of the attachment sleeve to the center bar via pins or bolts. In some embodiments, the brace platforms each have a top edge and a bottom edge, wherein the top edges of the brace platforms are attached at or near the top edge of the base platform and the bottom edges of the brace platforms remain unattached to the base platform.

In some embodiments, the universal attachment device further comprises an ice spade welded to the attachment sleeve. In some embodiments, the universal attachment device further comprises a forage fork welded to the attachment sleeve. In some embodiments, the universal attachment device further comprises a retaining wall block moving attachment with hook welded to the attachment sleeve.

BRIEF DESCRIPTION OF THE DRAWINGS

FIG. 1 is a perspective view of the universal attachment device of the present invention.

FIG. 2 is an exploded view of components of the universal attachment device of FIG. 1.

DESCRIPTION OF PREFERRED EMBODIMENTS

Figure 3:
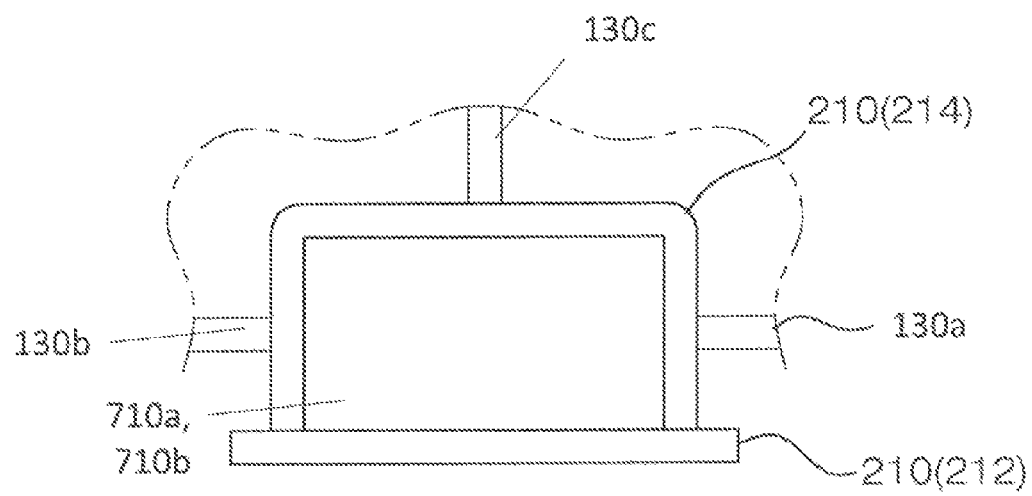
FIG. 3 is a front view of the attachment sleeve of the universal attachment device of the present invention.

Referring now to FIG. 1-8, the present invention features a universal attachment device 100 for attaching accessories to heavy machinery for tasks including but not limited to moving retaining walls and/or crushing ice. The universal attachment device 100 comprises a center bar 110 having a first end 111 and a second end 112. The center bar 110 may be constructed in a variety of shapes, for example in some embodiments, the center bar 110 has a generally rectangular, square, or oval cross section. As shown in FIG. 2, the first end 111 of the center bar 110 is generally slanted or beveled.

Disposed on the second end 112 of the center bar 110 is a base platform 120, wherein the base platform 120 is positioned generally perpendicularly to the center bar 110. The base platform 120 has a front surface 120a, a back surface 120b, a first side edge 120e, a second side edge 120f, a top edge 120c, and a bottom edge 120d. In some embodiments, the second end 112 of the center bar 110 is attached to the front surface 120a of the base platform 120 at or near the bottom edge 120d (e.g., about halfway between the first side edge 120e and the second side edge 120f). In some embodiments, the base platform 120 is constructed from an upper bar and a lower bar, which are connected together by a first crossbar and a second crossbar and optionally a third crossbar (see FIG. 1, FIG. 4), the first crossbar referring to the first side of the base platform 120, the second crossbar referring to the second side of the base platform 120, the upper bar referring to the top edge of the base platform 120, and the lower bar referring to the bottom edge of the base platform 120.

In some embodiments, side braces 130 are disposed on the outer surface of the center bar 110 where the center bar 110 attaches to the front surface 120a of the base platform 120. The side braces 130 may help to provide stability and durability to the device 100. As shown in FIG. 1, the side braces 130 are generally triangular in shape, however the side braces 130 are not limited to this shape. In some embodiments, a first side brace 130a is disposed on the first side 110a of the outer surface of the center bar 110, a second side brace 130b is disposed on the second side 110b of the outer surface of the center bar 110, and a third side brace 130c is disposed on the top side 110c of the outer surface of the center bar 110. The side braces 130 are each attached to both the center bar 110 and the base platform 120.

The universal attachment device 100 further comprises an attachment sleeve 210 attachable to the center bar 110 via an attachment means, for example via mounting holes 220 and bolts and/or pins. The attachment sleeve 210 is generally hollow (e.g., has an inner cavity) and generally trapezoidal in shape. For example, the attachment sleeve 210 has a top surface, a bottom surface, a slanted front 210a, and a flat or slanted back 210b. A first slot 710a is disposed in the back 210b of the attachment sleeve 210 adapted to receive the first end 111 of the center bar 110. In some embodiments, a second slot 710b is disposed in the front 210a of the attachment sleeve 210.

Referring now to FIG. 3, the bottom surface of the attachment sleeve 210 is a floor plate 212. The first side, top surface, and second side of the attachment sleeve 210 are formed from a curved top plate 214. Together the floor plate and the curved top plate 214 form the inner cavity of the attachment sleeve 210. In some embodiments, the floor plate 212 of the attachment sleeve 210 juts out beyond the side portions of the curved top plate 214. In some embodiments, this configuration may be particularly useful for attaching to other items (e.g., accessories 510, 520, 530, etc.).

As shown in FIG. 1 and FIG. 2, the attachment means may include one or more first mounting holes 220a disposed in the center bar 110 (e.g., near the first end 111), and one or more second mounting holes 220b disposed in the attachment sleeve 210. The mounting holes 220 allow for attachment of the attachment sleeve 210 to the center bar 110 via pins or bolts. For example, the second mounting holes 220b of the attachment sleeve 210 are aligned with the first mounting holes 220a of the center bar 110, and pins or bolts are slid through the pairs of mounting holes 220 to secure the attachment sleeve 210 to the center bar 110.

Figure 4:
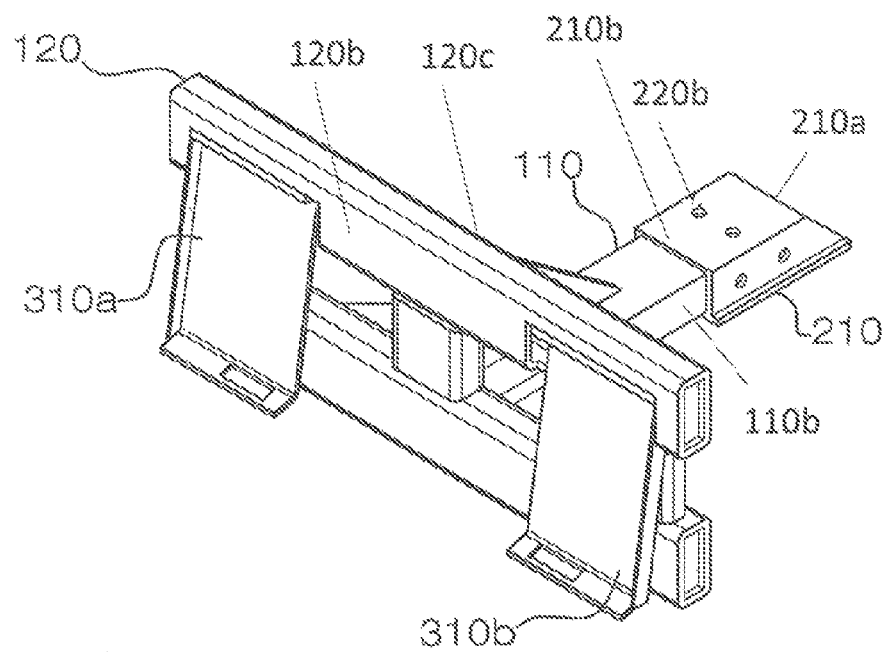
FIG. 4 is a perspective view of the universal attachment device of the present invention.

Referring now to FIG. 4, a first brace platform 310a is disposed on the back surface of the base platform 120 near the first side 210e and a second brace platform 310b is disposed on the back surface of the base platform 120 near the second side 120f. The brace platforms 310 may help provide strength to the base platform 120 and help prevent the base platform 120 from breaking. In some embodiments, the brace platforms 310 each have a top edge and a bottom edge, wherein the top edges of the brace platforms 310 are attached at or near the top edge of the base platform 120 and the bottom edges of the brace platforms 310 remain unattached to the base platform 120 (see FIG. 5).

In some embodiments, one or more lug components 150 are disposed on the front surface of the base platform 120. The lug components 150 may function to help attach or secure components, such as hydraulic attachments, to the base platform 120.

Figure 5:
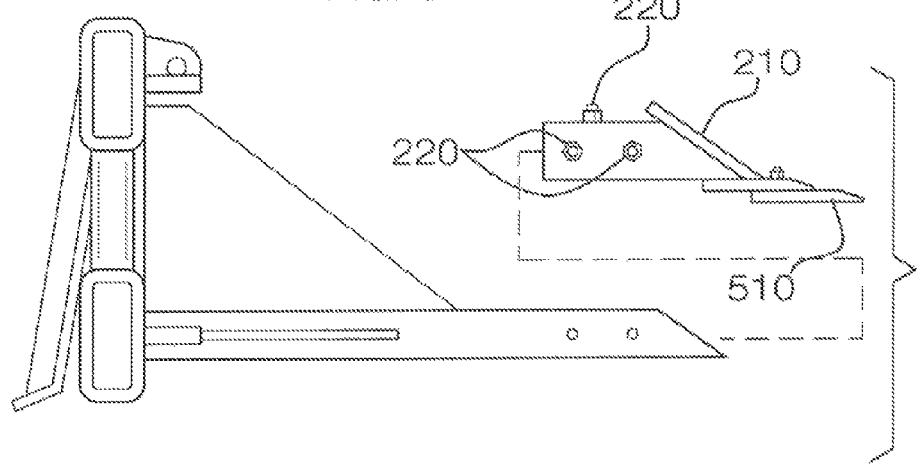
FIG. 5 is a side view of the universal attachment device of the present invention as attached to a first accessory (e.g., an ice spade).
Figure 6:
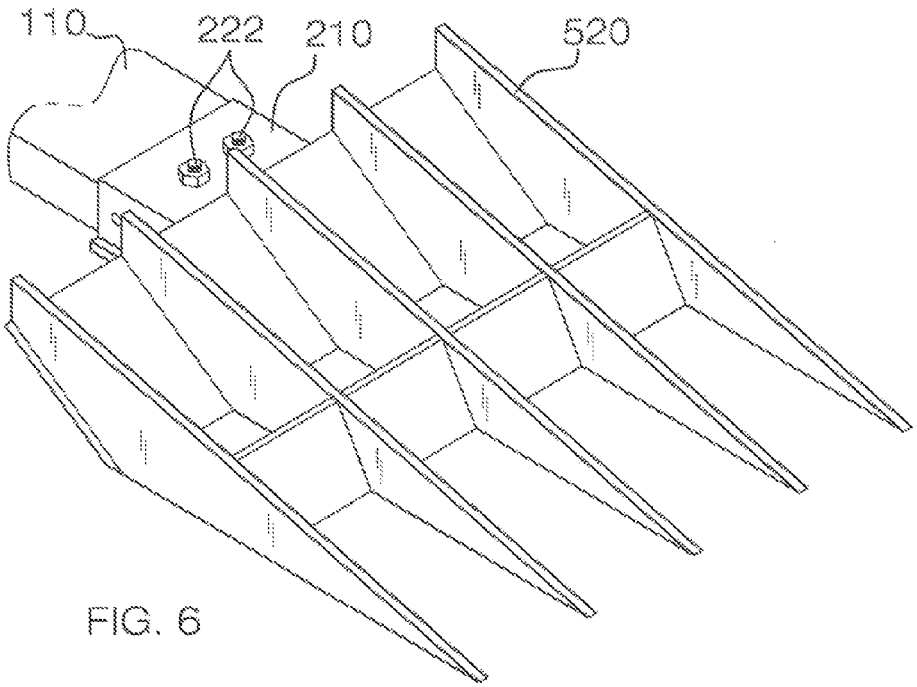
FIG. 6 is a perspective view of the universal attachment device of the present invention as attached to a second accessory (e.g., a forage fork).
Figure 7:
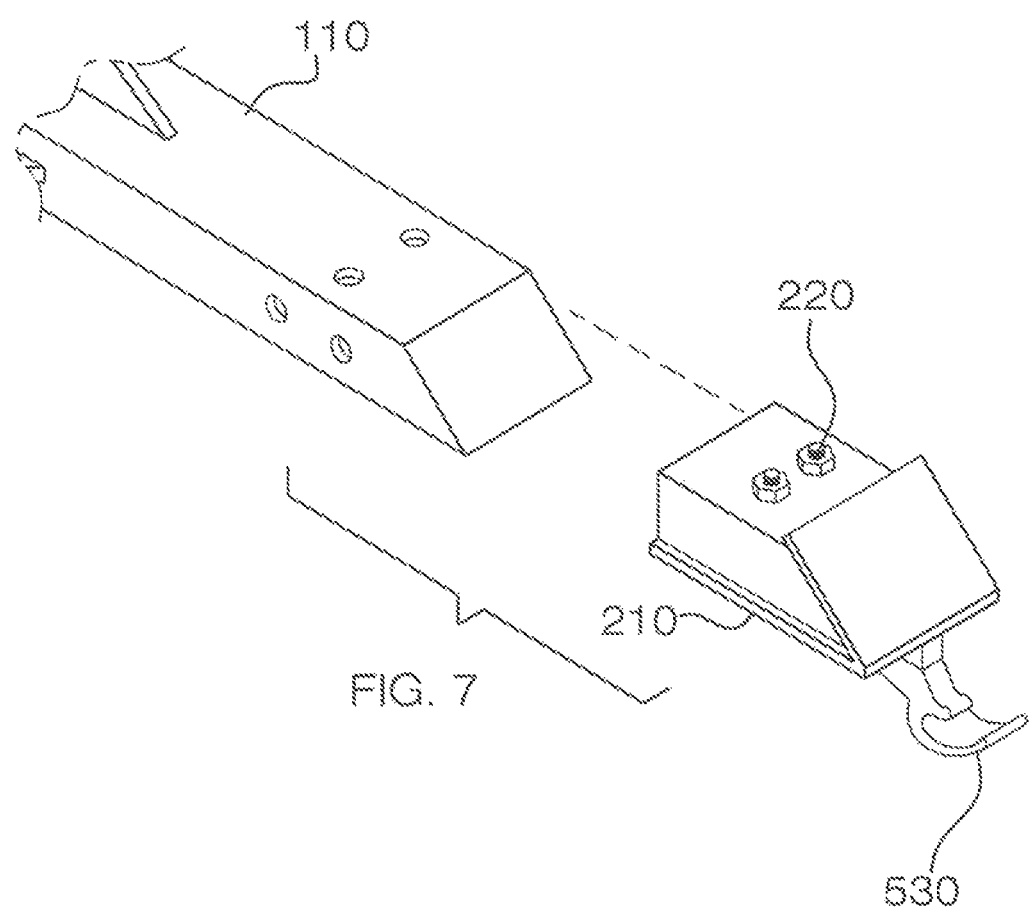
FIG. 7 is an exploded view of the universal attachment device of the present invention as attached to a third accessory (e.g., a retaining wall block moving attachment).

The attachment sleeve 210 can be welded to almost anything. For example, FIG. 5 shows a first accessory 510 (e.g., an ice spade) welded to the attachment sleeve 210 (e.g., to the front and/or bottom surface of the attachment sleeve 210). The attachment sleeve 210 is then bolted to the center bar 110. FIG. 6 shows a second accessory 520 (e.g., a forage fork for loosening frozen or compacted forage) welded to the attachment sleeve 210 (e.g., to the front and/or bottom surface of the attachment sleeve 210). The attachment sleeve 210 is then bolted to the center bar 110. FIG. 7 shows a third accessory 530 (e.g., a retaining wall block moving attachment with hook) welded to the attachment sleeve 210 (e.g., to the front and/or bottom surface of the attachment sleeve 210). The attachment sleeve 210 is then bolted to the center bar 110.

Figure 8:
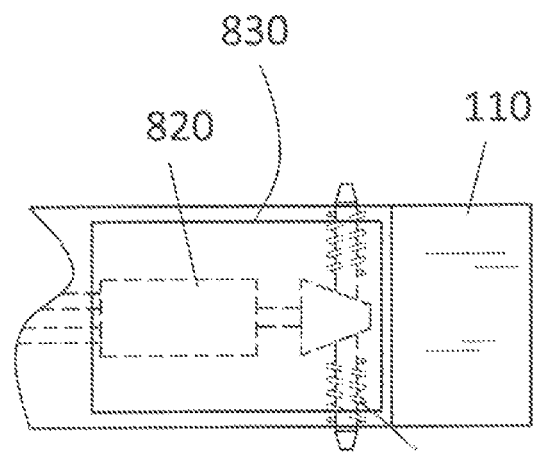
FIG. 8 is a top view of an alternative embodiment of the present invention.

Referring now to FIG. 8, the present invention may also feature a quick attachment system. For example, a spring-loaded pin 810 may be disposed in the center bar 110 at or near the first end 111. The spring-loaded pin 810 may be generally perpendicular to the center bar 110 (e.g., see FIG. 8). The spring-loaded pin 810 can move between at least an in position (wherein the spring-loaded pin 810 is in the inner cavity of the center bar 110) and an out position wherein the spring-loaded pin 810 extends through a side aperture disposed in the side of the center bar 110 (or though a pair of side apertures in the sides of the center bar 110). The spring-loaded pin 810 may be operatively connected to a hydraulic system. In some embodiments, the spring-loaded pin 810 is operatively connected to a ram 820. The ram 820 may move in a forward motion, moving the spring-loaded pin 810 to the out position (e.g., see FIG. 8). The ram 820 may move backwardly, moving the spring-loaded pin 810 to the in position. In some embodiments, the spring-loaded pin system allows the device to be attached to multiple types of lifts and loaders, not limited to a skid-steer loader.

The disclosures of the following U.S. Patents are incorporated in their entirety by reference herein: U.S. Pat. No. 6,568,898; U.S. Pat. No. 3,587,887; U.S. Pat. Application No. 2006/0193716; U.S. Pat. No. 2,301,808; U.S. Pat. No. 6,481,949; U.S. Pat. No. 5,597,281; U.S. Pat. No. 7,229,109.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A universal attachment device comprising:
    (a) a center bar 110 having a first end 111 and a second end 112, the first end 111 being beveled;
    (b) a base platform 120 having a front surface 120a, a back surface 120b, a top edge 120c, and a bottom edge 120d, wherein the second end 112 of the center bar 110 is attached to the front surface 120a of the base platform 120 at or near the bottom edge 120d, the base platform 120 being generally perpendicular to the center bar 110;
    (c) a first side brace 130a disposed on a first side 110a of the center bar 110 and attached to the front surface 120a of the base platform 120, a second side brace 130b disposed on a second side 110b of the center bar 110 and attached to the front surface 120a of the base platform 120, and a third side brace 130c disposed on a top side 110c of the center bar 110 and attached to the front surface 120a of the base platform 120;
    (d) a generally hollow and generally trapezoidal attachment sleeve 210 for removably attaching to the center bar 110 via an attachment means, the attachment sleeve 210 has a slanted front 210a and a back 210b, wherein a first slot 710a is disposed in the back 210b, the first slot 710a is adapted to receive the first end 111 of the center bar 110;
    (e) a first brace platform 310a disposed on the back surface 120b of the base platform 120 near a first side 120e and a second brace platform 310b disposed on the back surface 120b of the base platform 120 near a second side 120f; and
    (f) one or more lug components 150 disposed on the front surface 120a of the base platform 120.

2. The universal attachment device of claim 1, wherein the center bar 110 has a generally rectangular cross section.

3. The universal attachment device of claim 1, wherein the side braces 130 are each generally triangular in shape.

4. The universal attachment device of claim 1, wherein a second slot 710b is disposed in the front 210a of the attachment sleeve 210.

5. The universal attachment device of claim 1, wherein the attachment means includes one or more first mounting holes 220a disposed in the center bar 110 near the first end 111 and one or more second mounting holes 220b disposed in the attachment sleeve 210, the mounting holes 220 are adapted to allow attachment of the attachment sleeve 210 to the center bar 110 via pins or bolts.

6. The universal attachment device of claim 1, wherein the brace platforms 310 each have a top edge and a bottom edge, wherein the top edges of the brace platforms 310 are attached at or near the top edge 120c of the base platform 120 and the bottom edges of the brace platforms 310 remain unattached to the base platform 120.

7. The universal attachment device of claim 1 further comprising an ice spade 510 welded to the attachment sleeve 210.

8. The universal attachment device of claim 1 further comprising a forage fork 520 welded to the attachment sleeve 210.

9. The universal attachment device of claim 1 further comprising a retaining wall block moving attachment with hook 530 welded to the attachment sleeve 210.

10. The universal attachment device of claim 1 further comprising a spring-loaded pin 810 disposed in the center bar 110 near the first end 111 of the center bar 110, wherein the spring-loaded pin 810 can move between at least an in position wherein the spring-loaded pin 810 is inside the center bar 110 and an out position wherein the spring-loaded pin 810 extends through a side of the center bar 110.

* * * * *